Figure 1:
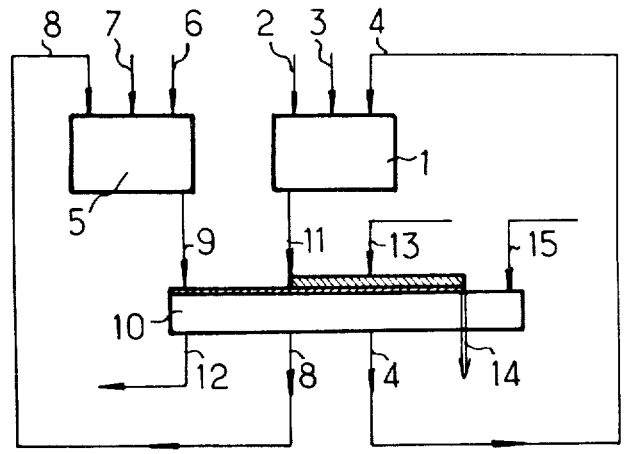

# United States Patent [19]

Gielly

[11] 3,911,079

[45] Oct. 7, 1975

[54] METHOD OF PRODUCING PHOSPHORIC ACID AND CALCIUM SULPHATE

[75] Inventor: Jean-Francois Gielly, Rouen, France

[73] Assignee: Rhone-Progil, Courbevoie, France

[22] Filed: Mar. 15, 1974

[21] Appl. No.: 451,454

Related U.S. Application Data

[63] Continuation of Ser. No. 235,132, March 16, 1972, abandoned.

[30] Foreign Application Priority Data

Mar. 23, 1971 France .................. 71.10132

[52] U.S. Cl. .................. 423/167; 423/320
[51] Int. Cl.²... C01F 1/00; C01F 5/00; C01B 25/16
[58] Field of Search .................. 423/166, 167, 320

[56] References Cited
UNITED STATES PATENTS

| | | | |
|---|---|---|---|
| 3,472,619 | 10/1970 | Chelminski et al. | 423/167 |
| 3,505,013 | 4/1970 | Araki et al. | 423/167 |
| 3,632,307 | 1/1972 | van Es et al. | 423/320 |
| 3,715,191 | 2/1973 | Rushton et al. | 423/320 |
| 3,745,208 | 7/1973 | Bigot et al. | 423/320 |

*Primary Examiner*—Oscar R. Vertiz
*Assistant Examiner*—Gregory A. Heller

[57] ABSTRACT

The production of phosphoric acid and calcium sulphate by reacting calcium phosphate and sulphuric acid in a continuous operation in a plurality of successively arranged reaction zones with the calcium phosphate and sulphuric acid distributed between the zones, filtering the slurry from each reaction zone and washing the filtered solids with water, returning the major portion of the acidified wash water into the first reaction zone and introducing the filtrate from each reaction zone to the succeeding reaction zone so that the $P_2O_5$ concentration increases in the succeeding reaction zones, and then collecting and removing the phosphoric acid product from the last reaction zone.

7 Claims, 5 Drawing Figures

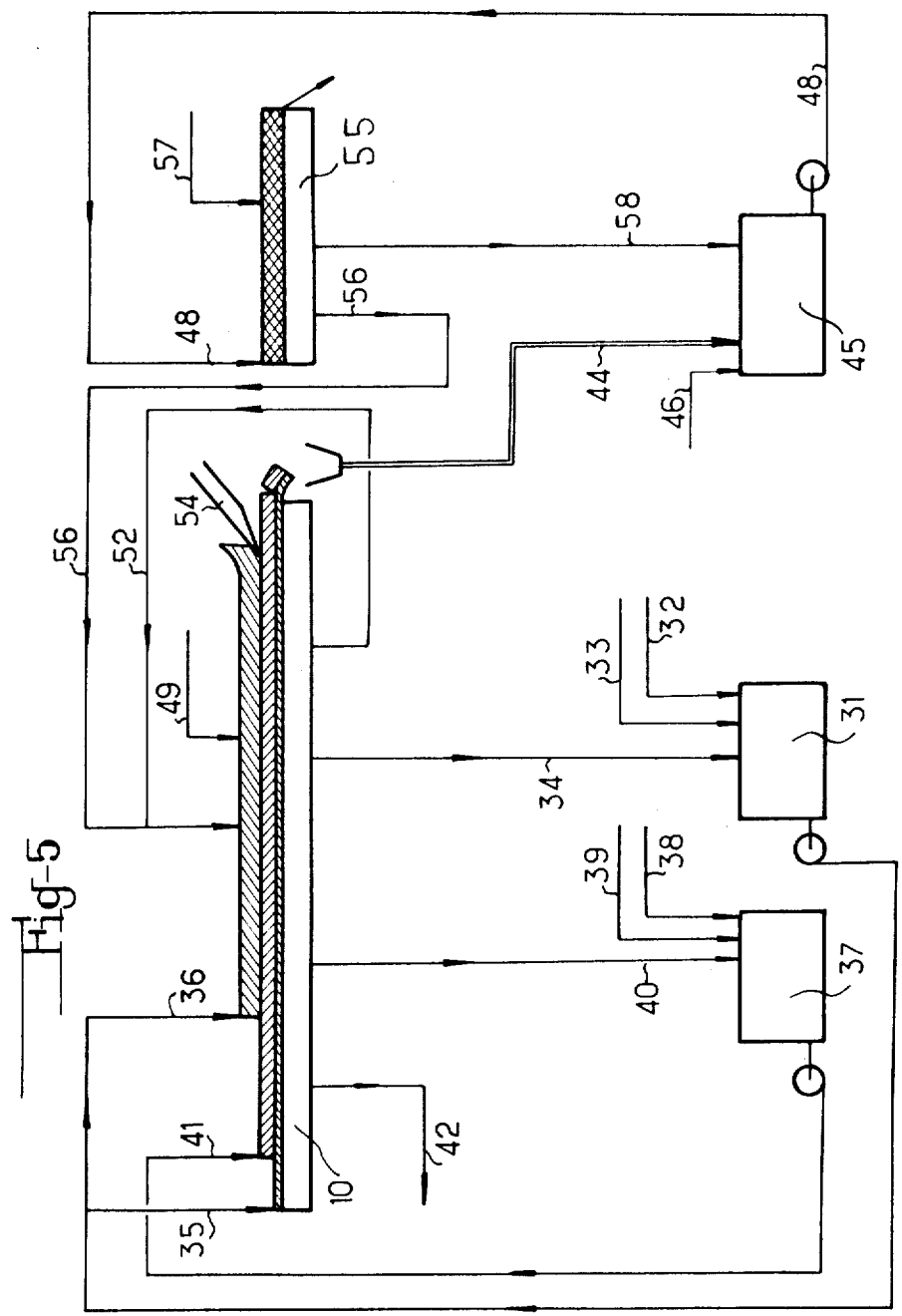

METHOD OF PRODUCING PHOSPHORIC ACID AND CALCIUM SULPHATE

This is a continuation, of application Ser. No. 235,132, filed Mar. 16, 1972, now abandoned.

The present invention relates to a process for producing phosphoric acid and calcium sulphate.

Processes based upon reacting phosphate in a series of reaction vessels, each receiving sulphuric acid, phosphate ore and dilute phosphoric acid, have been described, especially in French Pat. Nos. 814,064 and 1,212,825. In these processes, the slurry produced in the first vessel is passed into a second, and perhaps into a third or more vessels, so that the volumes of the slurries are additive and the reaction vessels are necessarily of large capacity. Moreover, these processes are capable of producing acid only of relatively low concentration, generally of the order of 30% $P_2O_5$.

Processes are also known which, in order to achieve a good chemical yield, propose that the phosphate be reacted under conditions which produce calcium sulphate in different successive forms, for example in the form of gypsum, which is subsequently recrystallized into semihydrate according to French Pat. Nos. 1,453,399 and 1,485,940, or conversely, first produces semihydrate which is subsequently recrystallized into gypsum, according to French Pat. Nos. 1,409,405, 1,344,871, 1,481,787, 1,498,272 and 1,534,672. These processes require that all of the calcium sulphate produced be filtered off twice, first in one form and then in another. Moreover, the apparatus used for treating the semihydrate is required to operate under difficult temperature and under corrosion conditions. Other well known difficulties caused by the separation of the semihydrate are also encountered; such as low yield of $P_2O_5$ and encrustation and clogging of the filter cloths.

It is an object of this invention to provide a method and apparatus for producing phosphoric acid and calcium sulphate in an efficient manner, at high rates and at high yields, and it is a related object to provide a method of the type described in which gypsum can be obtained in a high state of purity, which can be practiced with readily available commercial equipment or with slight modifications thereof, and in which less corrosion of equipment is experienced.

These and other objects and advantages of this invention will hereinafter appear and for purposes of illustration, but not of limitation, embodiments of the invention are shown in the accompanying drawings, in which:

FIGS. 1–5 are diagrammatic illustrations of different arrangements of equipment which may be employed in the practice of this invention.

According to the present invention, production of phosphoric acid and calcium sulphate comprises continuously reacting calcium phosphate and sulphuric acid in a plurality of successively arranged reaction zones, the calcium phosphate and sulphuric acid being distributed between the reaction zones, filtering the slurry produced in each reaction zone, washing with water the solid material filtered off, introducing, as dilute acid, the major part of the water resulting from the washing into the first reaction zone, introducing the filtrate from each reaction zone into a succeeding reaction zone so that the $P_2O_5$ concentration of the liquid phase of succeeding reaction zones is higher than that of preceding reaction zones, and collecting and removing the phosphoric acid product as a filtrate from the last reaction zone.

Although the slurry produced in each reaction zone can be filtered on a separate filter, it is particularly advantageous to use a single filter for all the slurries produced in the different reaction zones so that the solids collect in superimposed layers and to wash all the layers together with water. The wash water filtrate is then passed into the first reaction zone, the filtrate resulting from filtering the slurry of the first reaction zone is passed into the second reaction zone and so on, until the most concentrated filtrate, which results from filtering the slurry of the last reaction zone is reached. This last filtrate contains the phosphoric acid product.

Depending upon the temperature and the $P_2O_5$ concentration in each zone, the calcium sulphate, resulting from the reaction of the phosphate and sulphuric acid, crystallizes either in the form of its dihydrate, semihydrate or anhydrite.

It has been observed that unexpectedly, even where the crystalline state of the calcium sulphate differs from one slurry to another, the layers superimpose upon one another without interpenetration and without recrystallizations occurring in any appreciable amount or which adversely affect filtration.

Each slurry may be introduced onto the filter as soon as the preceding layer ceases to be covered with liquid.

In general, the different slurries are introduced onto the filter so that solid material from the one in which the liquid phase has the highest concentration of $P_2O_5$ comes first, and the solid material from the one in which the liquid phase has the lowest concentration of $P_2O_5$ comes next. In this way each layer of solid material is traversed by a liquid phase which has a lower $P_2O_5$ concentration than the liquid phase impregnating it and, thus, a first washing operation is carried out.

In one way of carrying out the present method, the temperature and $P_2O_5$ concentration in the liquid phase in each reaction zone are maintained such that calcium sulphate dihydrate is formed. In this case, it is advantageous to maintain in the liquid phase of the reaction zones preceding the last, a sulphuric acid content in excess of 30 grams per liter, and, preferably, of from 40 to 120 grams per liter and, in the last reaction zone, a sulphuric acid content of less than 30 grams per liter. Under these conditions a good yield of $P_2O_5$, stable operation, and a good filtration rate are obtained.

In another way of carrying out the present method the temperature and $P_2O_5$ concentration in the liquid phase are maintained in, at least, the last reaction zone such that sparingly hydrated or non-hydrated calcium sulphate, such as the semihydrate or anhydrite, are formed. In this case, it is advantageous to regulate the concentrations in the liquid phase in such a way that an excess of sulphuric acid does not occur.

When at least one of the slurries to be filtered contains gypsum and at least one of the slurries contains semihydrate, it is advantageous, in order to prevent the formation of scale, to filter a portion of the gypsum-containing slurry first so that a thin layer of gypsum is deposited on the filter and then to deposit thereon the layers of less hydrated sulphate, followed by the remainder of the gypsum.

In one modification, calcium sulphate dihydrate is formed in, at least, the first of the reaction zones and calcium sulphate semihydrate is formed in, at least, the last reaction zone. The calcium sulphate semihydrate is separated on the filter from the other forms of calcium sulphate and is transferred into a supplementary reaction zone where it is converted into calcium sulphate dihydrate by treatment with a liquid containing sulphuric acid and at least a part of the water that has been used for washing the solid materials, the wash water being then introduced into the first reaction zone as dilute phosphoric acid. The slurry of converted calcium sulphate is filtered and the filtrate is introduced into the first reaction zone. It is advantageous to remove the semihydrate from the filter after washing, to introduce onto the filter any slurry from a reaction zone in which gypsum is formed, followed by a slurry of the gypsum obtained by rehydration of the semihydrate previously extracted from the filter, the slurry having the highest $P_2O_5$ concentration being introduced first and that having the lowest concentration introduced next, and filtering and washing as previously described.

It has been found that with the present method, phosphoric acid can be obtained having a $P_2O_5$ concentration generally higher than 30% and more often as high as 40% to 42%, by operating under conditions such that gypsum is formed. Notably, concentrations of 34% to 38% of $P_2O_5$ can be obtained under practical and economic conditions. When the method is carried out under conditions such that, in at least some reaction zones, the semihydrate is formed, concentrations ranging from 40% to 55% $P_2O_5$ can easily be obtained. The phosphoric acid produced is not saturated with sulphuric acid. The yields obtained by the method of the invention are high, even at the highest concentration of $P_2O_5$. In particular, a very good yield is obtained because only a small quantity of $P_2O_5$ is lost with the by-product as syncrystallized bicalcium phosphate, in the reaction zones where gypsum is formed as a result of the high sulphuric acid content, and in the reaction zones where the semi-hydrate is recrystallized into gypsum by means of a dilute sulphuric acid medium, as a result of the recrystallization.

The washing yield is very good as a result of the filtration technique which is particular to the method of the invention. The filtration rates are from 1.5 to 4 times as large as they would be in the production of phosphoric acid of the same concentration by known processes, thus enabling the same quantity of a more concentrated acid to be obtained. With an equal production capacity of a specific filter, it is possible to increase the concentration by from 3 to 5 units of $P_2O_5$ percent, depending upon the phosphates and the operating conditions.

Each reaction zone can be constituted by any suitable apparatus. A zone may, in particular, be constituted by a non-compartmented vessel, such as that described in French Pat. No. 1,125,849, and fitted with the necessary agitation equipment, cooling means and purification equipment and with inlets for introduction of raw materials with means for regulating the rate and amounts. A zone can also be constituted by a compartmented vessel or a series of vessels, and especially a series of two vessels each having its independent raw material inlets. In each of the reaction zones, the conditions as regards the nature, origin, or fineness of the phosphate may be different, as also may be the concentrations of sulphuric acid, $P_2O_5$ and various additives, such as anti-foaming agents, crystalline appearance modifiers, and mineral compounds.

The method, in particular, enables a concentrated phosphoric acid to be produced by treating a phosphate, having unfavorable characteristics, in one or more reaction zones with a low $P_2O_5$ concentration, and an added portion of phosphate having favorable characteristics in a zone with a high $P_2O_5$ concentration.

Any type of filter generally employed in industry is, in general, suitable for use in the present method. An installation comprising a number of filters may be used and, in particular an installation used industrially in one of the known multiple filtration processes, the slurry inlets and the necessary acid piping being appropriately modified for use in the present method.

It is particularly advantageous to use a single, continuous, vacuum filter, having the property of cleanly separating the filtrates, such as the horizontal rotating table filter, such as described in French Pat. No. 1,327,693, optionally provided with a "presector" as described in French Pat. No. 1,334,531. When semihydrate is treated on a filter of the type described in French Pat. No. 1,327,693, it is advantageous first to place in contact with the filtering surface a thin layer of gypsum slurry produced in one of the reaction zones, followed by the layer or layers of semihydrate. When it is desired to separate one or more layers of solid material preferentially, one or more distinct solid material extraction devices are associated with the filter, such as scrapers or Archimedian screws and corresponding hoppers or funnels. In all cases, the filter comprises only a single filter cloth washing zone, located at the end of the filtration cycle.

Referring now to the drawings, FIG. 1 shows a reaction vessel 1 constituting a reaction zone; although not shown there may be more than one reaction vessel, the agitation, purification and other auxiliary equipment of which are not illustrated. The phosphate is introduced through a duct 2, sulphuric acid through a duct 3 and weak phosphoric acid, resulting from washing of the solid materials, through a duct 4. A vessel 5, constituting another reaction zone, receives phosphate through a duct 6, sulphuric acid through a duct 7 and phosphoric acid produced by the reaction in the vessel 1, through a duct 8. The slurry produced in vessel 5 is delivered through a duct 9 to a filtering apparatus 10, which then receives, through a duct 11, the slurry produced in vessel 1. The production is collected and removed through a duct 12. Water for washing the solid materials is introduced through a duct 13, the solid materials are removed through a duct 14 and water for washing the filtering apparatus 10 is introduced through a duct 15. The circuits for methodical washing of the solid materials are not shown, nor are the known devices, such as the "filtration presector" which may be attached to the filtering apparatus 10.

Figure 2:
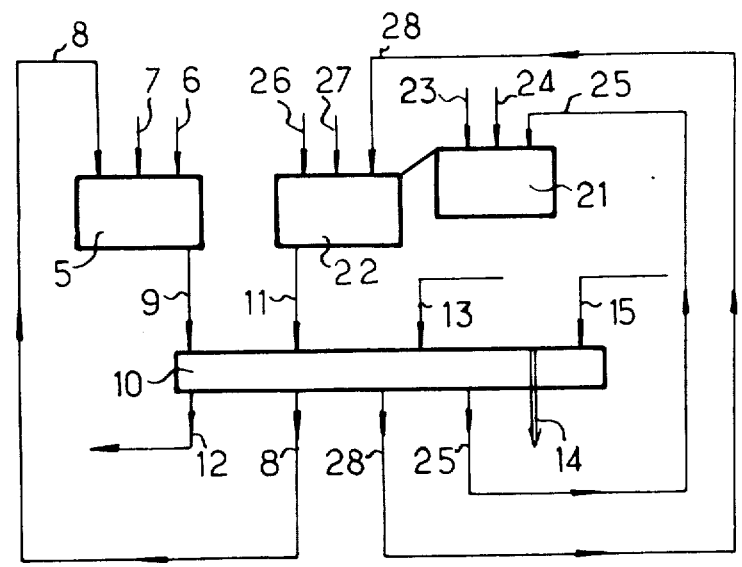

In the apparatus of FIG. 2, the first reaction zone is composed of two reaction vessels 21 and 22, each having its own means of supply for phosphate, sulphuric acid and phosphoric acid, represented respectively by ducts 23, 24, 25 for the vessel 21 and ducts 26, 27, 28 for the vessel 22. The supplies are controlled such that the $P_2O_5$ concentration in the liquid phase in the vessel 22 is higher than that in the liquid phase in the vessel 21 and that the calcium sulphate is precipitated in the same form, whether gypsum, semihydrate, or anhydrite, in the two vessels 21 and 22. The reaction vessel 5 may, in a variation (not shown) of the apparatus, be formed of two communicating reaction vessels, controlled so that the calcium sulphate precipitates in the same form therein. The slurries produced in the reaction vessels 21 and 22 may also, in another variation (not shown) of the apparatus, be filtered separately, on the filtering apparatus 10; the second vessel 22 then receiving only the mother liquor produced in the vessel 21. It is possible to carry out the present method by means of the apparatus of FIG. 2, by regulating the operating conditions in such a way that there is produced in the vessels 21 and 22 a gypsum slurry and a semihydrate slurry in the vessel 5. In this case, it is advantageous slightly to modify the apparatus, by providing an auxiliary duct (not shown) to enable a small amount of gypsum to be delivered from the vessel 22 onto the filtering apparatus 10.

Figure 3:
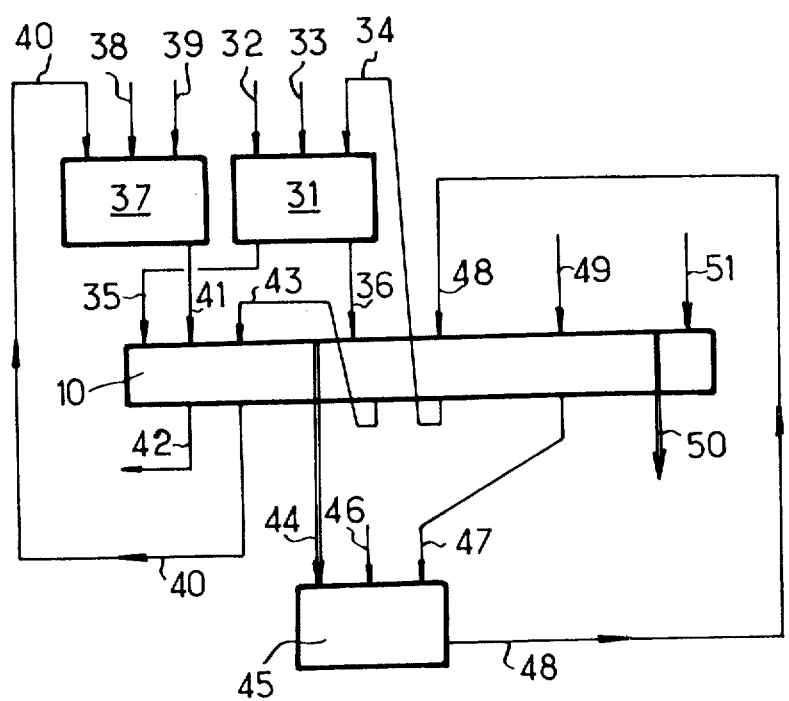

FIG. 3 shows an apparatus comprising a vessel 31 provided with agitation, refrigeration, purification and other auxiliary equipment. There may be more than one such vessel 31 but these are not shown. The phosphate is introduced through a duct 32, sulphuric acid through a duct 33 and weak phosphoric acid, derived from the washings of solid material on the filtering apparatus 10, through a duct 34. Ducts 35 and 36 enable the gypsum slurry, produced in the reaction vessel 31, to be delivered to the filtering apparatus. In a vessel 37, the conditions are especially controlled to produce semihydrate. It is supplied with phosphate through duct 38, with sulphuric acid through duct 39 and with weak phosphoric acid through a duct 40. The semihydrate slurry produced is delivered to the filtering apparatus 10 through duct 41. The concentrated phosphoric acid, constituting the final product, is collected via the duct 42. The superimposed layers of solid materials are washed on the filtering apparatus by liquid delivered through duct 43, after which the semihydrate layer is removed and delivered through duct 44, to a recrystallization and reaction vessel 45, which receives, through duct 46, an additional quantity of sulphuric acid and through duct 47 very weak phosphoric acid resulting from the washing of the solid materials. A duct 43 enables the recrystallized gypsum from vessel 45 to be delivered onto the gypsum layers previously delivered to the filtering apparatus by the ducts 35 and 36. A duct 49 is provided to deliver water to the filtering apparatus for washing the solid materials which are subsequently removed through a duct 50 while a duct 51 is provided for the delivery of water for washing the filtering apparatus.

Figure 4:
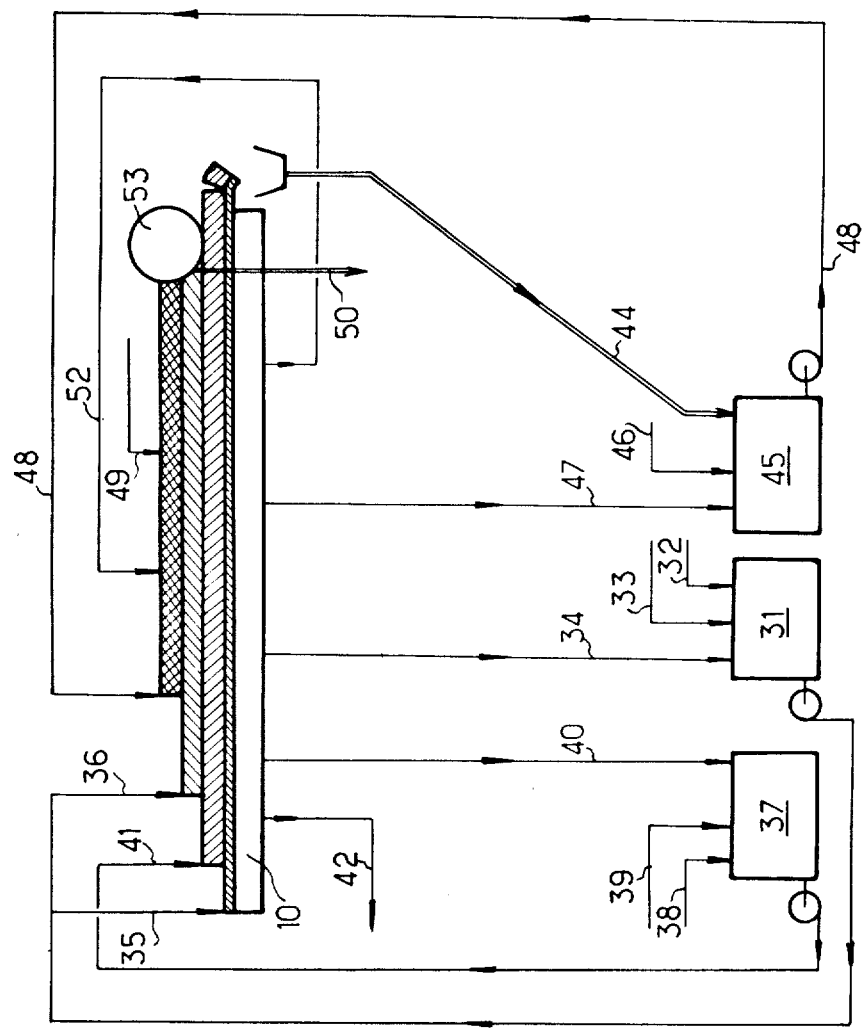

FIG. 4 shows a modification of the previously described apparatuses. In the apparatus of FIG. 4, the phosphate is reacted in reaction vessels 31 and 37, as described with reference to FIG. 3, but another method of filtration is used. In this method, there are deposited successively onto the filtering apparatus a thin layer of gypsum through the duct 35, then a layer of semihydrate through the duct 41, then the remainder of the gypsum produced in the vessel 31 through the duct 36 and then the recrystallized gypsum produced in the vessel 45 through the duct 48. The whole mass of solid material is then methodically washed by liquid delivered through the duct 52. Finally, the semihydrate layer is extracted separately by means of a device 53, delivered through the duct 44 to the vessel 45 where it is recrystallized and then returned onto the filtering apparatus, as before, through the duct 48. This method has the advantage of extracting, from the filtering apparatus, a very well washed cake of semihydrate which enables the recrystallization to be carried out rapidly, with a very low reaction volume and a very good extraction yield of $P_2O_5$. It is useful, in this method, to make use of a type of filtering apparatus which gives a larger than average filtering surface.

The present method may also be carried out so as to reduce or eliminate the phosphate fraction reacted to form gypsum. In this case, one or more reaction zones would be controlled to produce the semihydrate reaction zones, a reaction zone would be provided for recrystallization of the semihydrate into gypsum and layers of semihydrate and gypsum would be superimposed on a filtering apparatus from which the semihydrate would be extracted, as before, and transferred to the recrystallization zone.

In the apparatus of FIG. 5, gypsum and semihydrate are produced, as previously described, in vessels 31 and 37, and the resulting slurries are filtered to leave superimposed layers on the filtering device 10. The semihydrate is extracted separately by means of a device 54 and is recrystallized into gypsum in the recrystallization vessel 45 by means of a liquid constituted by a washing liquid introduced through a duct 58 and sulphuric acid introduced through duct 46. The converted calcium sulphate is transferred through the duct 48 to a second filtering apparatus 55, and the filtrate is delivered through the duct 56 into the washing zone of the filtering apparatus 10, before being delivered to the vessels 31, 37 through ducts 34, 40, respectively. Additional water for washing the solid material on the filtering apparatus 55 is provided through the duct 57. The apparatus 55 treats only a portion of the total of solid materials, and under conditions of low corrosion, and it is therefore smaller and of simpler construction than the filtering apparatus 10.

The method, according to the invention, has the advantage of producing a pure gypsum, particularly in the reaction zone where a high content of sulphuric acid is maintained and in the reaction zone where gypsum is produced by recrystallization of the semihydrate. Further, it enables the layer or layers of gypsum having the highest purity to be separately extracted.

The present method also has advantages in that it permits a choice in the manner of operating and in the operating conditions thereby enabling it to be best adapted to the quantity and the concentration of the acid which it is desired to produce and to the nature of the raw material. Notably, the method makes possible the simultaneous use of a number of phosphates by avoiding the mixing if different slurries, which could have a disadvantageous effect. It is thus possible to keep the most "noble" and most expensive phosphate in the reaction zones where the $P_2O_5$ concentration is the highest. Another advantage is that the method can be operated in apparatuses currently used in industry. Already existing works, comprising a number of reaction systems, can be adapted very easily to carry out the mthod of the invention. The method also enables the performance of an existing installation to be improved by adding to it one or more reaction zones, the slurries produced being superimposed on the existing filtering apparatus. Moreover, in the cases where semihydrate is produced, the difficulties of operating in a corrosive medium are combined only for a portion of the phosphate, generally amounting to from 25% to 75% of the total. Similarly, the reaction vessels required for the recrystallization of semihydrate have only a reduced volume, thus enabling only the corresponding portion of calcium sulphate to be treated.

The following examples are now given by way of illustration of the practice of the invention and not by way of limitation. In all the examples, the filtration rate is defined by the specific output of the filter, this being expressed in kilos of $P_2O_5$ produced per square meter of filtering area per hour, for a cake thickness corresponding to 40 kilos of calcium sulphate dihydrate per square meter.

EXAMPLE 1

The apparatus of FIG. 1 was used, each reaction zone being constituted by one vessel. 74.5 parts of crushed Togo phosphate were introduced into the vessel 1. The operating conditions were regulated in such a way that the liquid in vessel 1 had a sulphuric acid content of about 75 g/l. The conditions were such that gypsum was formed and the content of solid materials of the vessel 1 was maintained constant at about 35% by weight. The $P_2O_5$ concentration of the liquid in vessel 1 was 30.6%. 25.5 parts of crushed Togo phosphate were introduced into the vessel 5. The operation was regulated to give gypsum-forming conditions and a sulphuric acid content of about 20 g/l and a $P_2O_5$ content of 39.75% in the vessel 5. The slurries from the vessels were filtered to form two superimposed layers of solid material on the filter and a specific output from the filter was obtained of 330 kg of $P_2O_5/m^2/H$. By way of comparison, the specific output was measured under the same conditions of a slurry obtained by a known process using a single reactor. The slurry contained phosphoric acid having a $P_2O_5$ content of 40% of $P_2O_5$, and a specific output of 90 kg of $P_2O_5/m^2/H$ was obtained.

The total reaction yield of the phosphates by the present method, from analysis of the solid materials, was 98.35%. This yield results from the reaction, with a yield of 99%, of 74.5 parts of phosphate in vessel 1 and from the reaction, with a yield of 97.1%, of the 25.5 parts of phosphate in vessel 5.

EXAMPLE 2

The apparatus of FIG. 2 was used. The method was carried out under gypsum-forming conditions in the vessels 21 and 22 and under semihydrate-forming conditions in the vessel 5. 37 parts of crushed Togo phosphate were introduced into the vessel 21, regulated so as to have a sulphuric acid content of about 75 g/l and a solid materials content of about 40% by weight. The $P_2O_5$ concentration was about 27% in vessel 21.

27 parts of phosphate were introduced into vessel 22 in which a sulphuric acid content was maintained at about 30 g/l and a solid materials content of about 35% by weight. The $P_2O_5$ concentration was about 37.5% in the liquid phase.

36 parts of phosphate were introduced into vessel 5 in which a sulphuric acid content of about 8 g/l was maintained. A liquid phase was obtained having a mean $P_2O_5$ concentration of 49.85%. Filtration was carried out by superimposing on the filter of the filtering apparatus a thin layer of gypsum from the vessel 22, then the semihydrate from the vessel 5, and finally the remainder of the gypsum from the vessel 22.

The analysis of the solid materials showed that a total yield of phosphate of 97.55% was obtained, this yield resulting from a yield of 98.95% obtained from the 64 parts of phosphate in vessels 21 and 22, and from a yield of 94.8% obtained from the 36 parts of phosphate in vessel 5. This is an improved yield of 2.75% relative to a conventional process consisting of treating 100% of phosphate in semihydrate-forming conditions. To this improved yield there is to be added a gain in the washing yield, due to the fact that the water balance is more favorable because there is in addition available, for the washing of the solid materials, the difference of the quantity of water of crystallization existing between the gypsum and the semihydrate for 64% of the phosphate treated, or about 160 liters of water per ton of phosphate treated. In addition, the purest calcium sulphate constitutes the upper layer of the filter cake, and it can be easily extracted and separately recovered.

A specific filtration output of 180 kg of $P_2O_5$ per $m^2$ per hour was obtained. By way of comparison, the specific filtration output obtained during the production of acid containing 50% of $P_2O_5$ by treating the whole of the phosphate in the form of semihydrate, according to a known method, is 100.

EXAMPLE 3

The apparatus of FIG. 3 was used and the method was carried out under gypsum-forming conditions in the vessel 31 and under semihydrate-forming conditions in the vessel 37. 100 parts per hour of crushed Togo phosphate were introduced into the vessel 31 and 93% sulphuric acid in such a quantity that the liquid phase of the slurry contained about 73 g/l of sulphuric acid.

The apparatus was regulated and operated in such a way that the solid materials content of the reactive medium was constant, especially by the use of a known device, not shown, for regulating the flow of weak acid derived from the washings and introduced through the duct 34. The temperature was maintained at 75°C., the liquid phase of the reaction medium then containing 29.3% of $P_2O_5$. It was found that the gypsum formed contained only 0.4% of syncrystallized $P_2O_5$ and 0.7% of non-solubilized $P_2O_5$, the total loss was therefore only 1.10% of $P_2O_5$ for the phosphate introduced into the first reaction zone, that is vessel 31.

108.5 parts per hour of crushed Togo phosphate were introduced into the vessel 37 together with 93% sulphuric acid, the flow of the latter being regulated so that the liquid phase of the slurry contained 8 g/l of sulphuric acid and 49.8% of $P_2O_5$. The temperature was maintained at 91°C and the solid materials content was maintained practically constant. By means of the duct 35, a small flow of the slurry produced in the vessel 31 was delivered to the filter so that a gypsum layer of 4 mm mean thickness was formed, the slurry produced in the reaction vessel 37 was then delivered onto the filter through the duct 41 and this slurry formed a layer superimposed upon the layer of gypsum already present. The turbid liquids or those corresponding to the layer of gypsum were collected in a device, not shown, such as a filtration presector, then the concentrated acid containing 49.8% of $P_2O_5$, which constituted the product, was collected and taken away through the duct 42. The layers or cake thus formed were washed by a washing liquid introduced through a duct 49 and a second washing, not shown in the figure, was carried out by a weak acid diverted from the duct 47 supplying the recrystallization vessel 45.

Using devices (not shown) such as Archimedian screws or channels, the portion of the cake constituted of semihydrate was extracted and removed to the recrystallization vessel 45, where it was subjected to the action of a reaction medium containing 100 g/l of sulphuric acid. The remainder of the gypsum slurry produced in the first reaction vessel 31 was delivered to the filter through the duct 36, and then the slurry produced in the recrystallization vessel 45 was delivered to the filter through the duct 48. All the layers on the filter were methodically washed, for example by a conventional method, using 260 parts per hour of washing water. The layers were removed and the filter cloths were washed with water. Altogether 184 parts of sulphuric acid had been used.

The final yield based on the whole (208.5 parts) of the phosphate used was 98.75%.

Of the 108.5 parts of phosphate treated under semihydrate forming conditions, the portion subsequently recrystallized into gypsum, there was a total loss of only 0.6% of $P_2O_5$, made up of 0.4% of syncrystallized $P_2O_5$ and 0.20% of non-solubilized $P_2O_5$; for the remaining 100 parts of phosphate, a loss of 1.10% $P_2O_5$ was observed, giving a mean loss of 0.84%, to which must be added a loss of 0.40% due to washing.

The filtration rates correspond to a filter area substantially equivalent to the first phase of filtration and to the second. The total filter area necessary in the production of 50% acid was only 10–20% larger than that which would have been necessary for the production by a conventional process, of an equal quantity of acid containing 30% of $P_2O_5$.

EXAMPLE 4

The same apparatus as used in Example 3 was used and the same temperatures were also used.

100 parts of phosphate were introduced into the vessel 31 and 104 parts into the vessel 37. The sulphuric acid content was maintained constant in the liquid phases of two vessels at 70 g/l and at 6 g/l, respectively, and the $P_2O_5$ content in the liquid phases were very close to 35% and 55% of $P_2O_5$, respectively.

Filtration was carried out under the same conditions as in Example 3 and it was found that the filter areas necessary were less than if the whole of the phosphate had been treated in the semihydrate state.

EXAMPLE 5

The same apparatus as used in Example 3 was regulated for the introduction of 100 parts of phosphate into vessel 31 and 296 parts into vessel 37.

The liquid phases of the two vessels had $P_2O_5$ concentrations very close to 25% and 55% of $P_2O_5$ respectively, and the sulphuric acid content was very close to 85 g/l and 6 g/l, respectively.

Filtration was carried out as described in Example 3 but using a slightly larger filter area. The yield was higher than that obtained in the two preceding examples, because of reduction of the losses both of syncrystallized $P_2O_5$ and of nonsolubilized $P_2O_5$.

EXAMPLE 6

Using the same apparatus and operating under the same conditions as in Example 5, 100 parts of phosphate were treated in the first vessel 31, having a $P_2O_5$ concentration in the liquid phase of about 32% and a sulphuric acid content of about 75 g/l and 37.9 parts of phosphate were treated in the second vessel 37, having a $P_2O_5$ concentration in the liquid phase of 40% and a sulphuric acid content of 12 g/l. A yield in excess of 98% was obtained with a filtering area approximately equal to that required for producing by a known method an acid containing 33% of $P_2O_5$.

EXAMPLE 7

The apparatus of FIG. 4 was used, the conditions in vessel 31 being dihydrate-forming conditions and those in vessel 37 being semihydrate-forming conditions. 100 parts per hour of crushed Togo phosphate and sulphuric acid of 93% concentration were introduced into vessel 31, the liquid phase of the resulting gypsum slurry containing about 30 grams of sulphuric acid per liter and having a $P_2O_5$ concentration of 37.5% by weight. 24 parts per hour of crushed Togo phosphate were introduced into vessel 37, with sulphuric acid, the flow rate being regulated so that the liquid phase of the resulting slurry containing 10 g/l of sulphuric acid and 43% of $P_2O_5$. A filter of the "Ucègo" type described in French Pat. No. 1,327,693 was used in the filtering apparatus 10 and was provided with the necessary accessories. A small quantity of the slurry produced in vessel 31 was fed onto the filter 10 through the duct 35, then the slurry produced in vessel 37 was fed onto the filter through the duct 41, then the remainder of the slurry from vessel 31 was fed onto the filter through the duct 36, followed by the gypsum slurry, through the duct 48, produced in vessel 45 by the recrystallization of the semihydrate. The superimposed cake layers were filtered together and washed together, using, in particular, water introduced through the duct 49, then, using an Archimedian screw 53, the gypsum layers derived from the slurries fed through the ducts 36 and 48 were removed at 50; the remainder of the cake, consisting essentially of semihydrate, was subsequently collected separately by the use of commonly known means for removing solids from filters. The semihydrate was delivered through the duct 44 into vessel 45, was treated with a mixture of sulphuric acid and of very low concentration phosphoric acid delivered from the filtering apparatus 10, and was rapidly recrystallized into gypsum. Because the semi-hydrate treated in vessel 45 had already been washed with water and thus contained very little $P_2O_5$, a residence time of less than 30 minutes in vessel 45 was quite sufficient for the recrystallization to take place.

EXAMPLE 8

The apparatus of FIG. 5 was used, the operation being carried out in dihydrate-forming conditions in vessel 31 and in semihydrate-forming conditions in vessel 37. 100 parts per hour of Togo phosphate were introduced into vessel 31 together with 93% concentration sulphuric acid. The liquid phase of the slurry produced contained about 40 g/l of sulphuric acid and 35% by weight of $P_2O_5$. 61 parts per hour of crushed Togo phosphate were introduced into vessel 37 together with 93% concentration sulphuric acid. The liquid phase of the slurry produced contained about 12 g/l of sulphuric acid and 48% of $P_2O_5$. As in Example 7, there were introduced successively onto the filter shown at 10, the slurry from vessel 31 via the ducts 35 and 36, and the slurry from vessel 37 via the duct 41. The cake layers deposited on the filter were filtered and washed using, in particular, water introduced through the duct 49. By means of the scraper 54, the major part of the gypsum layer delivered through the duct 36 was removed. The remainder of the cake, consisting essentially of semihydrate, was subsequently removed, using commonly known filter discharge means, and was conveyed through the duct 44 into the vessel 45 where, by means of a mixture of sulphuric and phosphoric acid having a very low $P_2O_5$ concentration, introduced respectively through ducts 46 and 58, recrystallization into gypsum was carried out in less than 30 minutes. The slurry from vessel 45 was introduced via the duct 48 to the second filtering apparatus 55, of smaller dimensions than apparatus 10, where it was filtered and washed. The strongly acidic filtrate leaving the filter 55 was conveyed by duct 56 to the weak acid washing zone of the cake of the filter 10. Additional water was introduced through duct 57 for washing the cake on the filter 55. The recrystallization period in vessel 45 was short because the semihydrate treated had already been washed, and the gypsum obtained was easily washed on the relatively small filter 55. The semihydrate treated in the vessel 45 was only a small fraction of the gypsum produced, since only 38% of the phosphate was treated under semihydrate-forming conditions.

It will be understood that changes may be made in the details of formulation and operation without departing from the spirit of the invention, especially as defined in the following claims.

I claim:

1. A method of producing highly concentrated phosphoric acid having a $P_2O_5$ content of greater than 30% and calcium sulphate, comprising reacting calcium phosphate and sulphuric acid continuously in a plurality of successive reaction zones, with each of the calcium phosphate and sulfuric acid being distributed among the reaction zones to obtain a plurality of slurries having different compositions, concentrations, temperatures and types of crystals, filtering the slurry produced in each reaction zone successively beginning with the slurry from the zone containing the highest concentration of $P_2O_5$ and continuing with the slurries having a lower $P_2O_5$ content than the preceding slurry in a single filter whereby superimposed layers of solid material are deposited on the filter, water washing the layers of solid material filtered off to provide a dilute acidic wash water containing $P_2O_5$, introducing a major part of the dilute acidic wash water into the first reaction zone, introducing the filtrate from each reaction zone into a succeeding reaction zone so that the $P_2O_5$ concentration of the liquid phase of succeeding reaction zones is higher than that of preceding reaction zones, and collecting and removing from the last reaction zone the filtrate which constitutes the phosphoric acid product having a $P_2O_5$ content of at least 30% by weight.

2. A method as claimed in claim 1, in which the temperature and $P_2O_5$ concentration in the liquid phase in each reaction zone are maintained such that calcium sulphate dihydrate is formed and the sulphuric acid content of the liquid phase in all the reaction zones except the last is maintained at a level above 30 grams per liter and in the last reaction zone the sulphuric acid content of the liquid phase is maintained at a level less than 30 grams per liter.

3. A method as claimed in claim 2, in which the sulphuric acid content of the liquid phase in all the reaction zones except the last is maintained at a concentration within the range of 40 to 120 grams per liter.

4. A method as claimed in claim 1, in which the temperature and the $P_2O_5$ concentration in the liquid phase of at least the last reaction zone are maintained such that calcium sulphate semihydrate is formed and the liquid phase is maintained so that it does not contain an excess of sulphuric acid.

5. A method as claimed in claim 4 which includes the steps of separating any calcium sulphate semihydrate formed from the filter, transferring the separated semihydrate to a supplementary reaction zone, treating the semihydrate with a liquid containing sulphuric acid and at least part of the water that has been used for washing the solid material on the filter for conversion to calcium sulphate dihydrate, filtering the slurry of converted calcium sulphate, and introducing the filtrate into the first reaction zone.

6. A method as claimed in claim 5 which includes the step of filtering the slurry of converted calcium sulphate with the filter from which the calcium sulphate semihydrate was removed.

7. A method as claimed in claim 6 which includes the steps of filtering the slurry of the converted calcium sulphate with a different filter than that from which the calcium sulphate semihydrate was removed, and washing the calcium sulphate semihydrate on the filter with the filtrate before introduction of the filtrate into the first reaction zone.

* * * * *